US005887102A

United States Patent [19]
Mueller et al.

[11] Patent Number: 5,887,102
[45] Date of Patent: Mar. 23, 1999

[54] FIBER OPTIC LIGHTLINE DEVICE HAVING RANDOMIZED INPUT AND OUTPUT FOR REDUCING SENSITIVITY TO INPUT VARIATIONS AND METHOD OF MAKING THE SAME

[75] Inventors: Rolf H. Mueller; Thomas A. Bender, both of Auburn, N.Y.

[73] Assignee: Fostec, Inc., Auburn, N.Y.

[21] Appl. No.: 754,072

[22] Filed: Nov. 20, 1996

[51] Int. Cl.⁶ .................................................. G02B 6/04
[52] U.S. Cl. ........................ 385/115; 385/116; 385/901; 362/32
[58] Field of Search .................... 385/115, 901, 385/116, 119, 120, 121, 89, 46; 362/32

[56] References Cited

U.S. PATENT DOCUMENTS

| | | | |
|---|---|---|---|
| 3,825,335 | 7/1974 | Reynolds | 385/119 |
| 4,057,338 | 11/1977 | Yevick | 385/119 |
| 4,523,803 | 6/1985 | Arao et al. | 385/7 |
| 4,534,615 | 8/1985 | Iwasaki | 385/121 |
| 4,845,596 | 7/1989 | Mouissie | 362/32 |
| 4,932,747 | 6/1990 | Russell et al. | 385/115 |
| 4,952,022 | 8/1990 | Genovese | 385/116 |
| 5,109,459 | 4/1992 | Eibert et al. | 385/115 |
| 5,187,765 | 2/1993 | Muehlemann et al. | 385/115 |
| 5,357,325 | 10/1994 | Kawaguchi | 355/277 |
| 5,367,596 | 11/1994 | Chow | 385/116 |
| 5,400,428 | 3/1995 | Grace | 385/115 |
| 5,418,879 | 5/1995 | Kalnajs et al. | 385/115 |
| 5,553,184 | 9/1996 | Eikelmann et al. | 385/115 |
| 5,568,964 | 10/1996 | Parker et al. | 385/901 |
| 5,661,837 | 8/1997 | Yamamoto et al. | 385/115 |

*Primary Examiner*—Hemang Sanghavi
*Attorney, Agent, or Firm*—Bond, Schoeneck & King, LLP; Brian B. Shaw

[57] ABSTRACT

A multi input fiber optic apparatus for cooperating with a plurality of sources, the apparatus having output ends of the individual fiber optics disposed in a random pattern, wherein a dimension of the linear array is broken into sub-lengths and each sub-length has a number of input bundles corresponding to the number of inputs for the apparatus. The input bundles are randomized at the output ends within each sub-length. The apparatus includes a housing for supporting a plurality of randomized sub lengths disposed adjacent each other within the housing, wherein each sub length includes a plurality of sub-bundles, the number of sub-bundles equaling or corresponding to the number of sources, and a plurality of inputs optical connected to the sub lengths, each of the inputs including a sub-bundle from each sub-length.

11 Claims, 4 Drawing Sheets

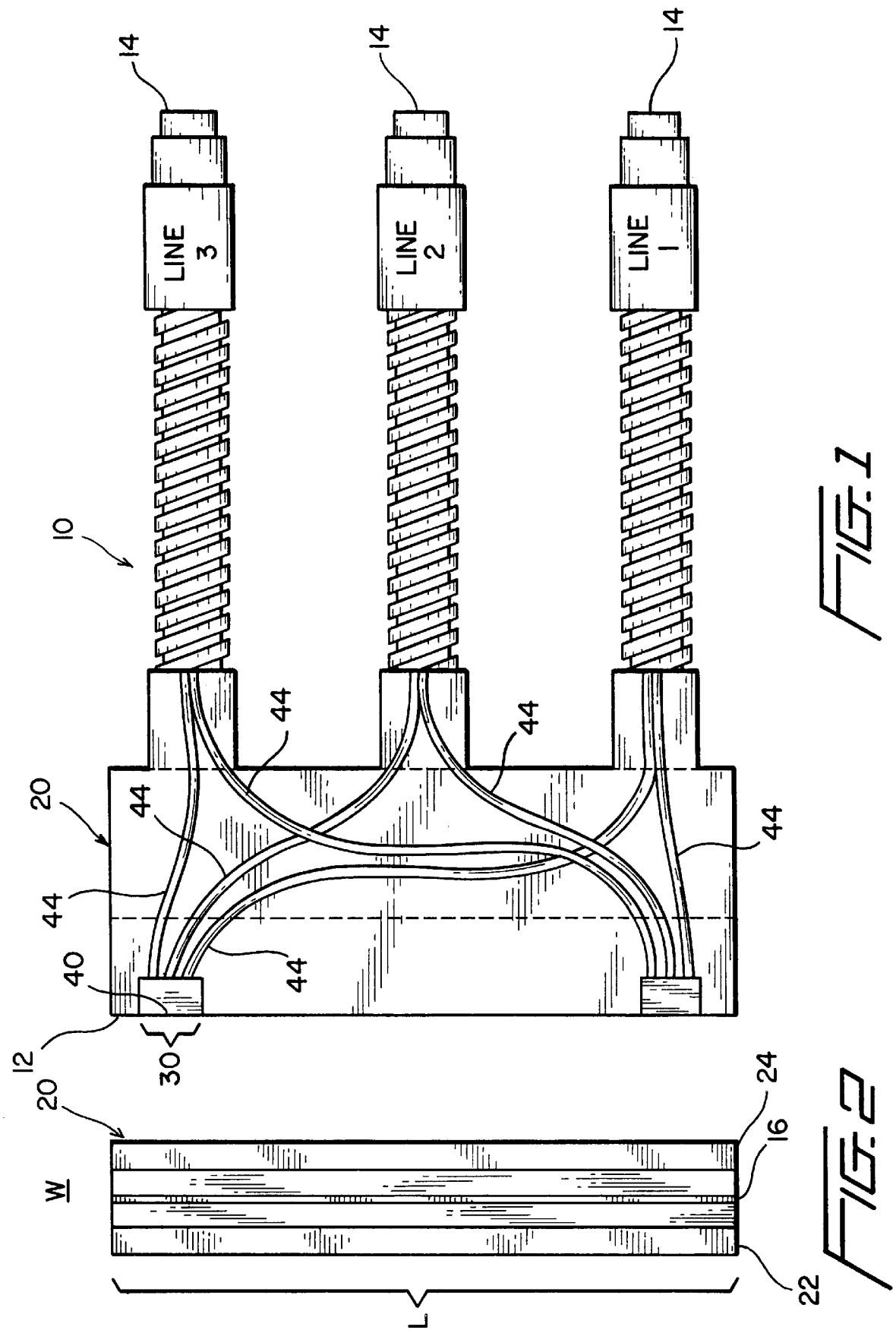

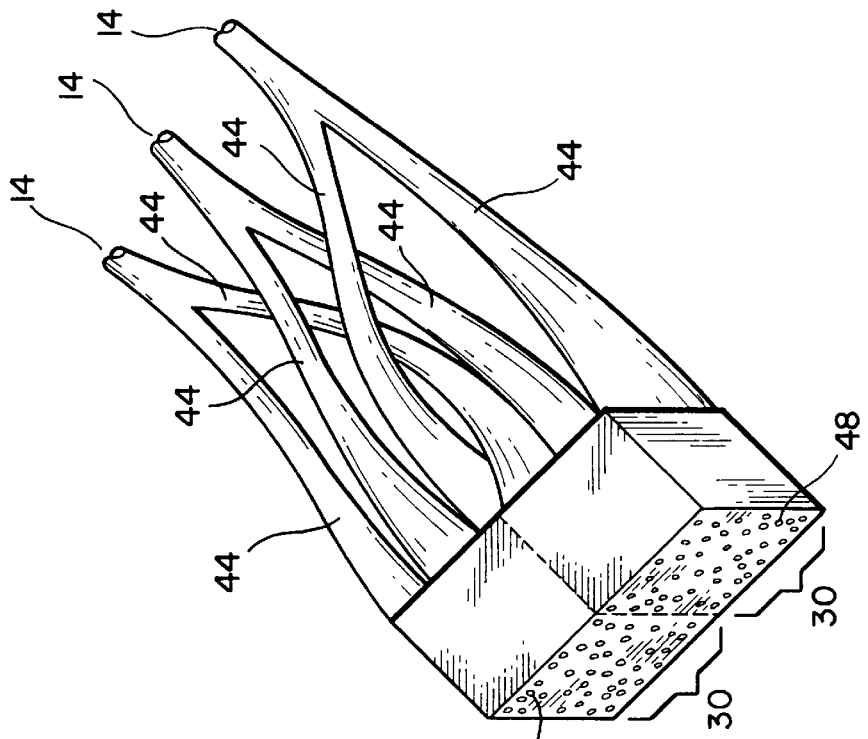
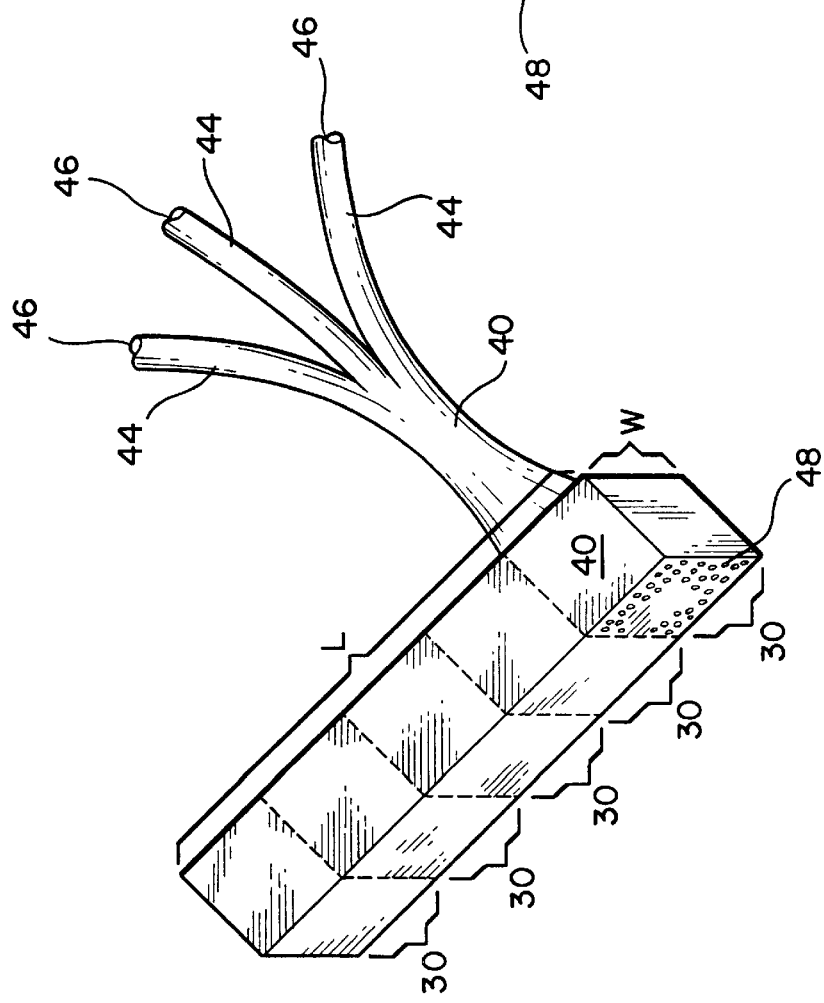

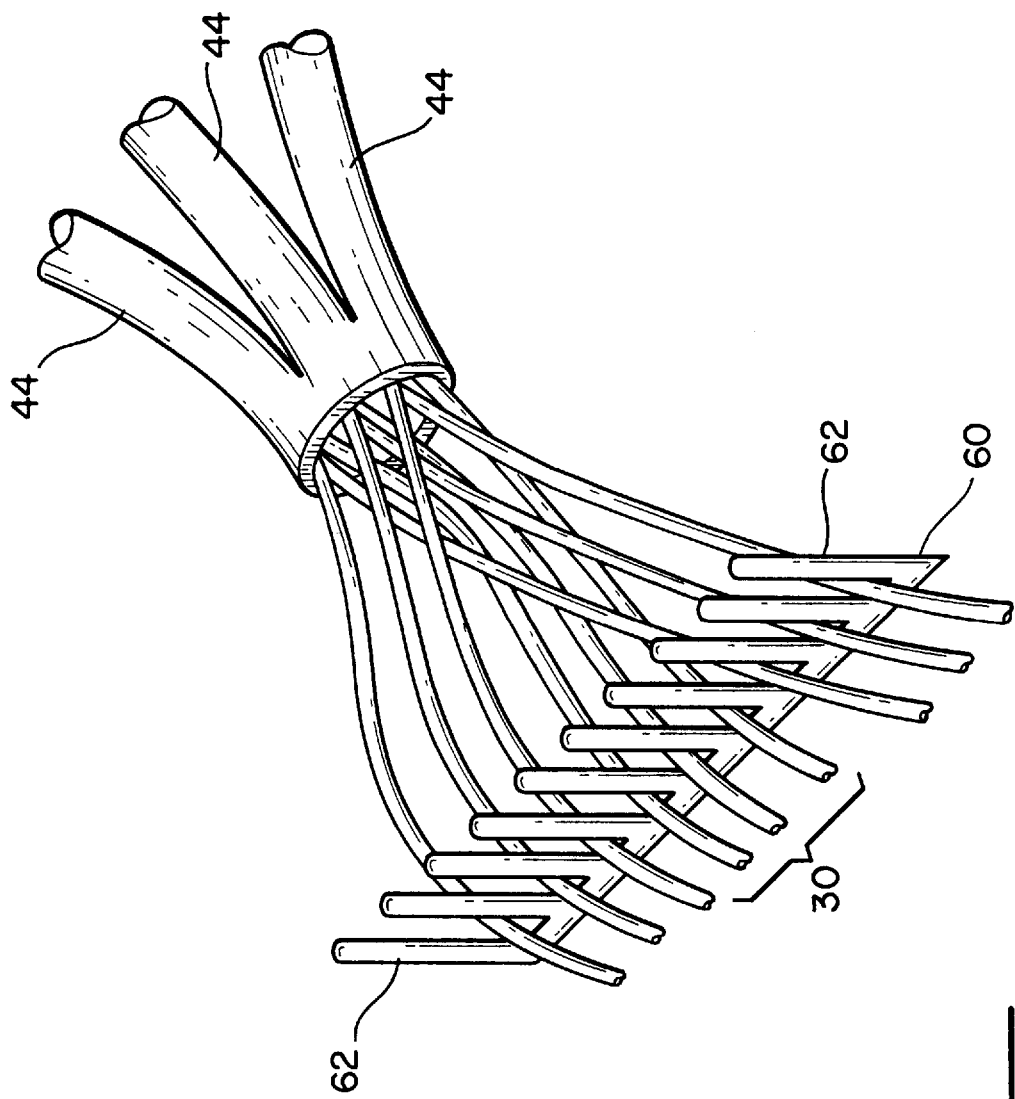

FIBER OPTIC LIGHTLINE DEVICE HAVING RANDOMIZED INPUT AND OUTPUT FOR REDUCING SENSITIVITY TO INPUT VARIATIONS AND METHOD OF MAKING THE SAME

FIELD OF THE INVENTION

The present invention relates to fiber optic systems for illuminating objects with a substantially uniform intensity, and more particularly, to a lightline device for transmitting energy from a plurality of inputs, wherein variance at an input is distributed over an entire output area of the lightline device.

BACKGROUND OF THE INVENTION

Lightline devices, often referred to as lightlines, line converters, linear arrays, light flanges or light arrays are fiber optic devices that reorient light from an input into a predetermined pattern such as a line. Lightline devices are commonly used for lighting in machine vision, web inspection, document scanning, microscopy and robotics. In practice, the lightline devices may have a length of less than an inch to more than a hundred inches. In those lightline devices having an elongate rectilinear output such as a line, the output may have a line thickness ranging from a few thousandths of an inch to tenths of an inch.

The lightline device may be retained in a housing having a length on the order of a few inches to a few feet. To produce lightline devices of greater length, structural and manufacturing considerations often require that these individual lightline housings be disposed within a common housing in an abutting or adjacent relationship to produce the longer lightline devices.

In contrast to the output of the lightline devices, the inputs are generally bundled, wherein a multitude of optical fibers are combined into a single input bundle. Individual fibers thus extend from an input geometry for exposure to a light source to terminate at a terminal end, the terminal end having a geometry dictated by the particular application.

However, the need exists for a lightline device, and preferably a device of modular construction, which accommodates multiple inputs, wherein the individual fiber location in the lightline output is randomized at the output or terminal end area so that variations in individual inputs or light sources are substantially uniformly distributed throughout the entire area of the lightline output. A need also exists for such randomized output in cooperation with a randomized input. That is, the need exists for a lightline device having multiple inputs, wherein fibers in a given input are randomly distributed at the output array. A further need exists for a method of constructing a lightline device with such randomized output and input, which is independent of lightline housing length. That is, a randomized lightline may be of any desired length. The need also exists for such lightlines to be disposed in a modular housing that facilitates modular construction of larger lightline devices having a continuous output array formed by a plurality of modular housings.

SUMMARY OF THE INVENTION

The present invention includes a method of forming a lightline device having a randomized input and output, wherein the randomization may be accomplished by randomizing sub bundles of optical fibers together or randomizing the sub bundles apart. The present invention also includes an apparatus constructed by such method.

Generally, the method of constructing a lightline device having an output of a desired length, includes selecting a sub length of the desired lightline output length; identifying a sufficient number of fibers in a bundle sized to occupy or fill the sub length; dividing the sufficient number of fibers by desired number of inputs to identify one of a number of fibers in a sub bundle or a number of sub bundles; and randomly distributing the output ends of the fibers of each sub bundle in a bundle within a sub-length. The sub lengths are then disposed in an adjacent or abutting relationship and retained within a housing to produce a substantially randomized output and thus a uniform illumination along the lightline. The sub bundle inputs within a given bundle are operably associated with the inputs, such that for each bundle at least one sub bundle input is aligned with each input. Further, the present invention includes a plurality of inputs, such that a corresponding end of each fiber within an input is randomly distributed in the lightline output. The present invention also provides a lightline with randomly distributed output, wherein the random distribution of the output is limited only by the physical length of the housing. Alternatively, the present invention may be employed in a modular housing for cooperatively aligning with similar housings to form a continues lightline.

BRIEF DESCRIPTION OF THE DRAWINGS

FIG. 1 is a top plan view of a lightline device incorporating the present invention;

FIG. 2 is an end elevational view of the output of the lightline device;

FIG. 3 is a schematic view of the output illustrating sub lengths of the output;

FIG. 4 is a schematic view of the sub bundle and a sub length and the association of a sub bundle input with a source;

FIG. 7 is a schematic view of the randomization process of sub bundles within a given bundle.

DETAILED DESCRIPTION OF THE PREFERRED EMBODIMENTS

Figure 5:
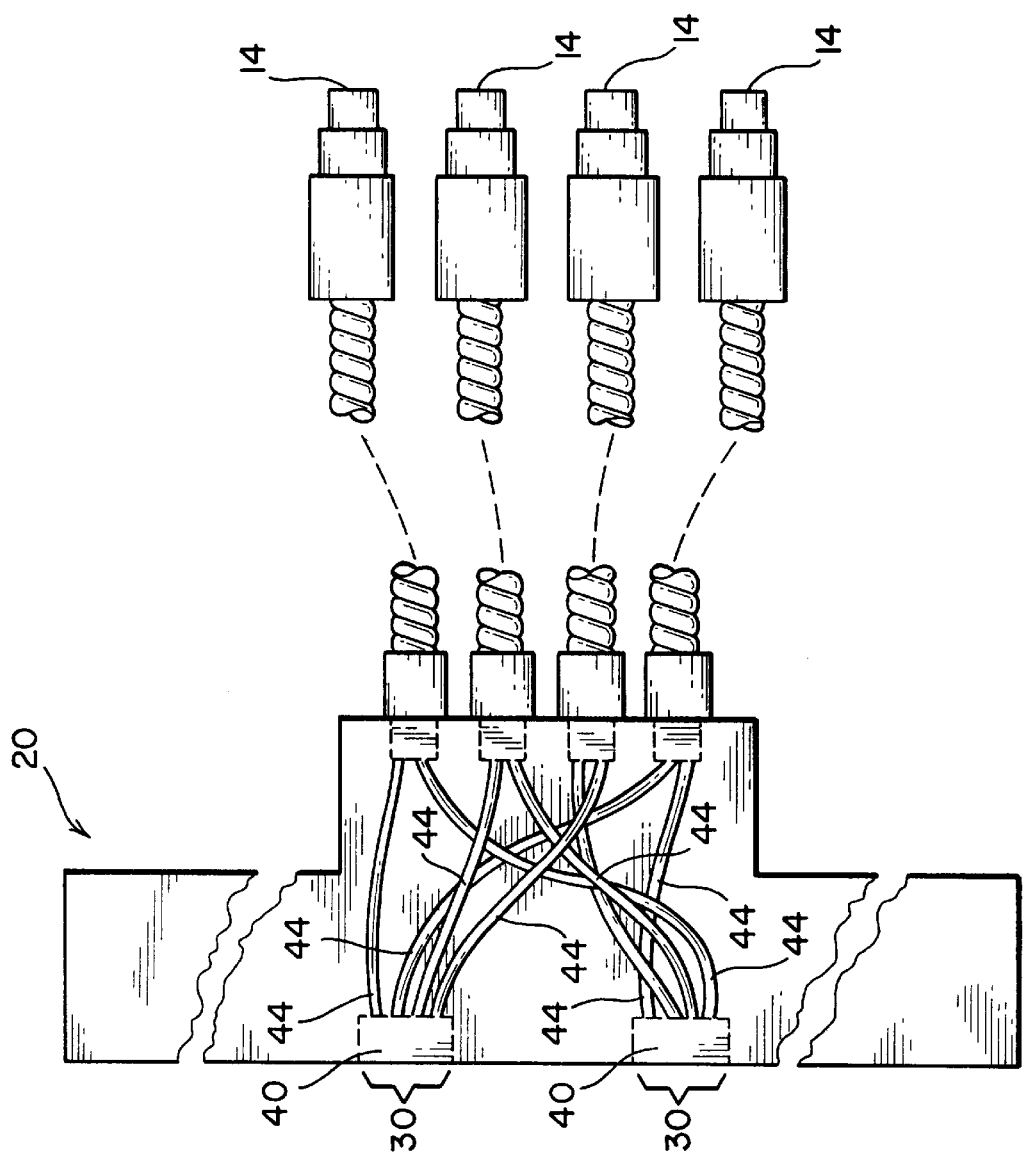
FIG. 5 is a top plan view of a four input embodiment.
Figure 6:
FIG. 6 is an end view of the embodiment shown in FIG. 5.

An apparatus 10 incorporating the present invention is disclosed in FIG. 1. The apparatus includes an output, emitting or terminal end 12 and receiving or inputs 14. It is understood the output end 12 may be any of a variety of configurations including rings, panels, blocks or linear arrays. For the purposes of description, the configuration of the apparatus output 12 will be referred to as a linear array 16. As shown in FIGS. 2 and 3, the linear array occupies an area defined by a length "L" and a width "W." While the inputs 14 of the apparatus 10 may also have a variety of configurations, the common industry standard is to dispose the input of the apparatus in a bundled substantially circular cross-section. It is also understood that the designation input 14 and output 12 is that of a relative input and output for purposes of description, and does not preclude use of either end of the device as an input or an output.

It is understood that the exact dimensions of the apparatus 10 including the linear array 16, as well as the number of inputs 14 may be dictated by application considerations. For purposes of description, the present invention will be described in terms of a three input lightline having a linear array output of a length of approximately 40 inches and a thickness of approximately 0.025 inches.

The optical fibers employed in the device may include glass or plastic fibers as well known in the art. The cross sectional configuration of the fibers and presence or absence of a buffer is also dictated by design and application considerations. It is understood the term fiber includes all optical fibers.

The output end of the fibers are retained in a housing 20 having a bottom portion 22 and a top portion 24 which may be affixed relative to each other by adhesives, bonding, welding or mechanical fasteners. In addition, the housing 20 may be constructed to allow the abutting of adjacent housings to form a substantially continuous length output. Alternatively, the housing may be a single unit of any desired length and overall construction, to which the method of the present invention is applied.

Method of Construction

In construction, the desired area occupied by the linear array 16 of the apparatus 10 is determined. That is, the linear array 16 may be designed to extend approximately to a length L of 40 inches with a thickness or width W of approximately 0.025 inches. Based upon this area and the parameters of the fibers, as well as the desired density of fibers at the output end 12, the amount or number of fibers necessary to fill the linear array 16 can be readily calculated. In the present example, the area of the present linear array is 1.00 square inch.

The length of the lightline, or linear array is then divided into a plurality of substantially equal sub-lengths 30. For purposes of illustration, a sub length 30 may be taken as 1.00 inch, thus identifying a bundle 40 of fibers to occupy the sub length. Therefore, in the present example, a bundle 40 has an output area of 1 inch by 0.025 inch or 0.025 square inches. This results in each bundle 40 having a diameter of approximately 0.15 inches to occupy a one inch sub-length 30 of the linear array 16. That is, the output area to be occupied by the fibers in a given sub length 30 is related to a bundle size. Again, it is understood that the specific sub length value may be any value less than the length of the linear array 16. Preferably, the sub lengths 30 are equal to each other and result in a manageable quantity of fibers within the defined bundle 40.

Thus, in the present example, forty bundles 40 each having the predetermined area (approximately 0.025 square inches) will be required to fully occupy the linear array 16.

The number of inputs 14 is then identified. The desired number of inputs 14 may be dictated by the intended operating environment or application of the apparatus 10. While the number of inputs 14 may equal a number of sources 50, the actual number of inputs 14 may be greater or less than the number of sources 50. Once the number of inputs 14 is identified, either of two randomization methods may be followed. In a first method, one end of each bundle 40 is randomized apart into a number of equal sized sub-bundles 44, wherein the number of sub-bundles 44 corresponds to, or equals the number of inputs 14. This process is repeated for each bundle 40.

It is contemplated that the number of sub bundles 44 may be equal to a fixed ratio with respect to the number of inputs 14 or sources 50. That is, for three inputs 14 or sources 50, there could be three, six, nine, twelve or more sub bundles 44 per sub length 30 (bundle 40).

Alternatively, rather than randomizing apart individual bundles 40, a number of equal sized sub-bundles 44 may be formed then randomized together, wherein the number of these sub-bundles is equal to the number of bundles (sub lengths 30) multiplied by the number of inputs 14. Again, it is contemplated that the number of sub bundles 44 may be equal to a fixed ratio with respect to the number of inputs 14. That is, for three inputs 14, there could be three, six, nine, twelve or more sub bundles 44 per sub length 30 (bundle 40). Output ends 48 of the sub bundles 44 within a given sub length 30 are randomized together to define the entire area of the output of the bundle 40. That is to form bundle 40 a number of sub bundles 44 as determined by the number of inputs 14 (or a ratio thereof) are randomized together.

In either approach, the total number of sub bundles 44 necessary for the apparatus 10 is readily determined by multiplying the number of sub bundles 44 in a given bundle 40 by the number of bundles (or sub lengths 30).

Therefore, in randomizing together in the present example of a device having three inputs 14 with a 40 inch length L linear array 16 and a 0.025 inch width W line thickness, and forty, one inch sub lengths 30, a resulting 120 sub bundles 44 are sized. For each bundle 40 (which fills a sub-length 30 of the linear array 16), a number of sub-bundles 44 equal to the number of inputs 14 is used, wherein the fibers included in this number of sub-bundles 44 provides sufficient quantity of fibers to occupy a sub length 30, and the combined sub lengths in turn provide a sufficient quantity of fibers to occupy the entire area of the linear array 16.

The output end 48 of the fibers in each sub-bundle 44 are randomly distributed with respect to vertical and horizontal positioning within a sub length 30. That is, the output ends of the fibers 48 from each of the sub bundles 44 within a given bundle 40 are mixed together so that an output end of a fiber from any of the sub bundles 44 is randomly positioned within the output area of the bundle 40.

The randomized distribution of the output ends 48 of the sub bundles 44 within a given bundle 40 is accomplished by either of two methods: (1) randomizing together or (2) randomizing apart.

Randomizing Together

Referring to FIG. 7, in the randomizing together procedure, the output ends 48 of the sub-bundles 44 in a given bundle 40 (sub length 30) are fanned out over a linear distance which is greater than the sub-length. Preferably, the fanned out sub bundle 44 has a thickness on a single order of fibers and may have only a single layer thickness. The output ends 48 of the fanned out fibers are retained in this configuration by a comb 60. Preferably, the comb 60 has a sufficiently high multiplicity of teeth 62 such that the number of fibers disposed between a pair of teeth is relatively small such as a single order of magnitude. Each of the sub-bundles 44 is thus fanned out over the entire comb length so that the resulting fanned out thickness may be multiple layers extending over a distance greater than a sub length.

Referring to FIG. 7, the fibers disposed at left and right ends of the comb 60, that is the outer fibers, are brought from the outer most teeth 62 to an inner set of teeth, wherein the inner set of teeth define a length equal to or less than the sub-length 30. The process continues, whereby the fibers in peripheral teeth 62 are brought within the inner set length of the comb 60 (having a length equal to, or less than a sub-length) and evenly distributed within this inner set length. The process is repeated until all the fibers are disposed within the inner section of the comb to form bundle 40.

A sub-length 30 is thus formed, wherein the terminal or output ends 48 of the fibers are randomly distributed in a random pattern, commonly referred to as salt and pepper. That is, the spatial distribution within the vertical and horizontal dimensions of the linear area is random.

The bundle 40 thus has a randomized output and an input composed of the three sub-bundles 44 having inputs 46. This process is repeated for each bundle 40. In the present example, forty bundles 40 are thus formed with randomized terminal ends 48 and each bundle having a number of sub bundle inputs 46 equal to or corresponding to the number of inputs 14.

Randomizing Apart

An alternative method of randomizing the output ends 48 of the fibers in a bundle 40 begins with all the fibers for the given bundle 40 (sub-length 30). That is, all the fibers of the bundle 40 are taken together and spread out into a substantially single layer, wherein the fibers are parallel. Again, an end of the fibers is retained in the comb 60. From this parallel, single thickness configuration, certain fibers are selected. Specifically, the fibers are selected in a manner corresponding to the number of inputs 14. That is, for three inputs 14, an input end 46 of the first sub-bundle 44 is formed from the parallel single thickness configuration of the bundle 40 by picking every third one of the fanned fibers along the parallel, single thickness configuration. The input end 46 of a second sub-bundle 44 is formed by picking every other of the remaining fibers and the input end 46 of third sub-bundle 44 is composed of the remaining fibers in the comb. The opposite end of the sub bundles are merely gathered together to form the output 48 of the bundle 40 with the three sub bundle inputs 46 formed by the selection. Each sub-length 30 (bundle output end 48) is thus randomized and formed with the requisite number of inputs 46.

Assembly

The formed sub lengths 30 (bundles 40), each having a randomized output end and three discrete inputs 46, are then retained in the housing. Although not required, it is contemplated that upon adjacent sub lengths 30 being disposed in the housing, the interface between the adjacent sub-lengths (bundles 40) at the output end 48 becomes blurred, thereby further randomizing the output ends over the area of the linear array 16. The sub lengths 30 may thus tend to "nest" into an adjacent bundle output end 42 upon being disposed within the housing to dispose the outputs 48 substantially coterminous with the housing. That is, the output of one bundle 40 may intermix with the fibers at the output end of an adjacent bundle.

As shown in phantom in FIG. 1, upon disposing the output ends 48 within the top and bottom housing 24, 22, some of the fibers in the first and last sub length are substantially coterminous with the "left and right" ends of the housing. Therefore, a number of housings 20 may be abutted to each other to form a substantially continuous uniformly distributed lightline. In addition, the output ends of the fibers and the face of the housing 20 may be simultaneously machined or cut to provide a face of the apparatus that lies in a single plane.

Input End

At the input of the apparatus, a sub-bundle input 46 from each sub length 30 is optically associated with a given input 14. That is, one sub-bundle 44 from each sub length 30 must be exposed to each input 14. If more sub bundles 44 than inputs 14 were formed for each bundle 40, then preferably an equal number of sub bundles 44 must be exposed to each input 14.

To create input 14, a sub bundle 44 is gathered from each sub length 30. These sub bundles 44 are then randomized together as previously set forth. This process is repeated for each input 14. It is understood the actual number of sub bundles 44 selected from each sub length 30 may be 1, or 2 or more if a ratio was employed. Therefore, upon any given input 14 being exposed to a variance, such as a complete outage of a source 50 or merely a replacement variance, the relative intensity of the entire lightline is uniformly shifted without creating hot or cold spots in the output.

As the terminal ends of the fibers are randomly distributed throughout the length and width of the lightline 10, the energy from any given input source 50 is substantially randomly distributed throughout the entire area of the lightline. Therefore, any variance in a source merely causes a relative upward or downward change of the light intensity along the lightline, rather than creating dark or bright spots.

Although the present invention has been described in terms of particular embodiments, it is not limited to these embodiments. Alternative embodiments or modifications which would be encompassed by the invention may be made by those skilled in the art, particularly in light of the foregoing teachings. Alternative embodiments, modifications or equivalents may be included in the spirit and scope of the invention, as defined by the claims.

We claim:

1. A method of producing uniform illumination along a lightline of a given length, comprising:
   (a) selecting a lightline sub length dimension which is less than the given length;
   (b) identifying a sufficient quantity of fibers to occupy a lightline sub length of the selected dimension;
   (c) dividing the sufficient quantity of fibers by a desired number of inputs to identify one of a number of sub bundles and a number of fibers in each sub bundle; and
   (d) forming the lightline sub length by randomly distributing one end of the sub bundles within the sub length dimension as a sub length output end and retaining a remaining end of each sub bundle as a discrete sub bundle input.

2. A method of producing uniform illumination along a lightline of a given length, comprising:
   (a) selecting a lightline sub length dimension which is less than the given length;
   (b) identifying a sufficient bundle of fibers to occupy the lightline sub length;
   (c) dividing the bundle of fibers by a desired number of inputs to form a number of sub bundles; and
   (d) forming the lightline sub length by randomly distributing one end of the sub bundles within a bundle to form an output end and retaining a remaining end of each sub bundle in the bundle as a discrete input.

3. A method of producing uniform illumination along a lightline of a given length, comprising:
   (a) selecting a lightline sub length dimension shorter than the given length;
   (b) identifying a sufficient bundle of fibers to occupy a lightline sub length of the selected dimension;
   (c) forming a plurality of sub bundles from the bundle of fibers, the plurality of sub bundles at least equal to a desired number of inputs; and
   (d) forming the lightline sub length by randomly distributing one end of the sub bundles in a bundle to form an output end and retaining a remaining end of each sub bundle in the bundle as a discrete input.

4. The method of claims 1, 2 or 3, further comprising operably aligning at least one sub bundle input in each lightline sub length with a unique input.

5. The method of claims 1, 2 or 3, further comprising disposing a plurality of lightline sub lengths adjacent each other to form the given length.

6. The method of claims 1, 2 or 3, further comprising corresponding the number of sub bundles to the number of inputs in a whole number relationship.

7. The method of claims 1, 2 or 3, further comprising operably aligning a remaining end from each lightline sub length with unique input.

8. The method of claims 1, 2 or 3 further comprising:
   (a) selecting a remaining end from each lightline sub length; and
   (b) randomizing the selected remaining ends together to form an input.

9. A fiber optic apparatus for transmitting energy from number of inputs to an output to create a substantially uniform intensity output, comprising:
   (a) a plurality of fibers having an input end and an output end;
   (b) a housing for retaining the output ends along a given length;
   (c) a plurality of bundles formed from the fibers and disposed adjacent each other within the housing, each bundle having a randomized output end occupying a length less than the given length and having a number of sub bundle inputs equal to an even multiple of the number of the inputs; each input optically connected to each bundle, and each input optically connected to at least one sub input in each bundle.

10. A multi-input fiber optic apparatus for transmitting energy from given number inputs to create a substantially uniform intensity output, comprising:
   (a) a plurality of fiber bundles having a source end and a randomized output end, the source end including a number of sub bundle inputs, the number of sub bundle inputs corresponding the given number;
   (b) a housing retaining a portion of each bundle to dispose a portion of each bundle adjacent a randomized output end of an adjacent bundle to form an output; and
   c) a given number of inputs formed by the sub bundle inputs, each input including a sub bundle input end from each bundle.

11. The apparatus of claim 10, wherein each sub bundle input end is uniquely optically aligned with a single source.

* * * * *